United States Patent
Tsukasaki

(10) Patent No.: US 10,877,526 B2
(45) Date of Patent: Dec. 29, 2020

(54) TERMINAL APPARATUS

(71) Applicant: FUJITSU CLIENT COMPUTING LIMITED, Kawasaki (JP)

(72) Inventor: Haruka Tsukasaki, Kawasaki (JP)

(73) Assignee: Fujitsu Client Computing Limited

( * ) Notice: Subject to any disclaimer, the term of this patent is extended or adjusted under 35 U.S.C. 154(b) by 0 days.

(21) Appl. No.: 16/560,049

(22) Filed: Sep. 4, 2019

(65) Prior Publication Data
US 2019/0391621 A1 Dec. 26, 2019

Related U.S. Application Data

(63) Continuation of application No. PCT/JP2018/005108, filed on Feb. 14, 2018.

(30) Foreign Application Priority Data

Apr. 7, 2017 (JP) .............................. JP2017-076554

(51) Int. Cl.
*G06F 1/16* (2006.01)
*E05D 11/00* (2006.01)
*F16C 11/04* (2006.01)

(52) U.S. Cl.
CPC ........ *G06F 1/1683* (2013.01); *E05D 11/0081* (2013.01); *F16C 11/04* (2013.01); *G06F 1/1616* (2013.01); *E05Y 2900/606* (2013.01)

(58) Field of Classification Search
CPC ....... G06F 1/162; G06F 1/1656; G06F 1/1681
(Continued)

(56) References Cited

U.S. PATENT DOCUMENTS

2002/0051339 A1\* 5/2002 Ohashi ................... G06F 1/203
361/679.46
2007/0285883 A1 12/2007 Nakajima et al.
(Continued)

FOREIGN PATENT DOCUMENTS

JP H01-130180 A 5/1989
JP H05-165546 A 7/1993
(Continued)

OTHER PUBLICATIONS

Translation of International Search Report for Patent Application No. PCT/JP2018/005108 dated May 1, 2018 (2 pages).
(Continued)

*Primary Examiner* — Anthony Q Edwards
(74) *Attorney, Agent, or Firm* — Harness, Dickey & Pierce, P.L.C.

(57) ABSTRACT

A terminal apparatus includes a body and a display that is rotatably joined to the body by a swivel shaft. Hinge mechanisms that open and close the display with respect to the body are provided on both sides of the swivel shaft. The hinge mechanisms are connected to the ground of the display and parts of the hinge mechanisms protrude from the lower edge of the display. Metal components that are connected to the ground of the body and support and make conductive contact with the protrusions of the hinge mechanisms are provided on the body. Since the grounds of the display and the body are connected by both the swivel shaft and the hinge mechanisms, a potential difference between the grounds of the body and the display is reduced compared to when the grounds are connected only via the swivel shaft.

12 Claims, 14 Drawing Sheets

(58) Field of Classification Search
USPC .................................................. 361/679.27
See application file for complete search history.

(56) References Cited

U.S. PATENT DOCUMENTS

| | | | |
|---|---|---|---|
| 2007/0291447 A1* | 12/2007 | Nakajima | G06F 1/1681 |
| | | | 361/679.26 |
| 2009/0040706 A1* | 2/2009 | Kobayashi | G06F 1/1635 |
| | | | 361/679.27 |
| 2012/0155005 A1* | 6/2012 | Lee | G06F 1/162 |
| | | | 361/679.26 |
| 2016/0195903 A1 | 7/2016 | Tatsukami et al. | |
| 2017/0179661 A1* | 6/2017 | Szeto | G06F 1/1675 |
| 2017/0356226 A1* | 12/2017 | Maatta | G06F 1/1641 |

FOREIGN PATENT DOCUMENTS

| | | |
|---|---|---|
| JP | 2007-328529 A | 12/2007 |
| JP | 2009-075865 A | 4/2009 |
| JP | 2014-085734 A | 5/2014 |
| WO | WO-2015/45132 A1 | 4/2015 |

OTHER PUBLICATIONS

Written Opinion of the International Searching Authority for Patent Application No. PCT/JP2018/005108 dated May 1, 2018 (6 pages).

* cited by examiner

TERMINAL APPARATUS

CROSS-REFERENCE TO RELATED APPLICATION

This application is a continuation application of International Application No. PCT/JP2018/005108 filed on Feb. 14, 2018 which designated the U.S., which is based upon and claims the benefit of priority of the prior Japanese Patent Application No. 2017-076554, filed on Apr. 7, 2017, the entire contents of which are incorporated herein by reference.

FIELD

The embodiments discussed herein are related to a terminal apparatus equipped with a swivel shaft.

BACKGROUND

In the market for notebook personal computers (PCs), there is a rising share for 2 in 1 terminal apparatuses that may be used as a conventional notebook PC and also as a tablet. The expression "2 in 1 terminal apparatus" here refers to a device equipped with the functions of both a notebook PC and a tablet. The expression "notebook PC" here refers to a device with a body, which includes a keyboard for data entry, and a display that is opened and closed with respect to the body. The expression "tablet" meanwhile refers to a device with a display screen but no physical keyboard, with data being entered via touch operations on the screen.

As one configuration of a 2 in 1 terminal apparatus, there are terminal apparatuses where it is possible to open and close the screen in the manner of a notebook PC and also possible to place the rear of the screen over the keyboard on the body to produce a tablet-like appearance. Such terminal apparatuses are sometimes called "convertibles". FIG. 1A depicts one example of a convertible 2 in 1 terminal apparatus 10 according to the background art. The convertible 2 in 1 terminal apparatus 10 has a shaft 3 that is perpendicular to a body 2 and is provided on the surface of the body 2 with a keyboard 23. This perpendicular shaft 3 is hereinafter indicated as the "swivel shaft 3". The swivel shaft 3 attaches the center of the lower edge of a display 1 to the body 2.

In this convertible 2 in 1 terminal apparatus 10, when opened from the body 2, the display 1 is capable of 360° rotation in the horizontal direction about an axis 3A of the swivel shaft 3. As depicted in FIGS. 2A and 2B, the swivel shaft 3 is incorporated in a dual-axis torque hinge apparatus 30 that joins the display 1 to the body 2.

The dual-axis torque hinge apparatus 30 has an arm 7 that extends to the left and right of the swivel shaft 3. Hinge mechanisms 40 that each have a hinge shaft 4 are provided at the ends of the arm 7. The arm 7 and the hinge mechanisms 40 are incorporated in the lower edge of the display 1 of the terminal apparatus 10, with brackets 41 of the hinge mechanisms 40 fixed to the display 1. As depicted in FIG. 2C, the swivel shaft 3 includes a base portion 32 at the body 2 side and a rotational shaft 31 that is inserted into the base portion 32. The base portion 32 is fixed to the body 2 and the rotational shaft 31 is inserted into a center portion of the arm 7 that extends to the left and right of the base portion 32. FIG. 2C depicts the construction of the rotational shaft 31 in isolation after removal from the base portion 32. When the rotational shaft 31 rotates, as depicted in FIG. 2A, the arm 7 and the hinge mechanisms 40 rotate, causing the display 1 to rotate in the direction of the arrows.

The outer circumferential surface of the rotational shaft 31 is provided with two pairs of parallel surfaces 3P that are perpendicular to each other and each formed from parallel surfaces on opposite sides of the axis 3A of the swivel shaft 3. A pressing mechanism 6 that applies pressure to the parallel surfaces 3P from both sides is provided on the base portion 32. Since a known configuration may be used as the pressing mechanism 6, no description is given here. Since the rotational shaft 31 has two pairs of parallel surfaces 3P, rotation of the swivel shaft 3 relative to the base portion 32 is inhibited at 90° intervals by the pressing mechanism 6. The pressing mechanism 6 is also referred to as a "click-stop mechanism". Due to this mechanism, rotation of the display 1 in the opened state with respect to the body 2 temporarily stops at positions 90° apart.

As depicted in FIGS. 2A and 2B, the hinge mechanisms 40 are formed on the hinge shafts 4 provided at the ends of the arm 7. The brackets 41 are rotatably attached to the hinge shafts 4. As described earlier, since the brackets 41 of the hinge mechanisms 40 are fixed to the display 1, the hinge mechanisms 40 enable the display 1 to rotate relative to the arm 7. As depicted in FIG. 1A, with a convertible 2 in 1 terminal apparatus 10 of this construction, it is possible to open and close the display 1 relative to the body 2 using the hinge mechanisms 40 and to rotate the opened display 1 by 360° around the axis 3A of the swivel shaft 3. Note that to enable the brackets 41 to rotate smoothly with respect to the hinge shafts 4, the hinge shafts 4 of the hinge mechanisms 40 are equipped with components such as presser plates, disc springs, and friction plates. However, since the construction of the hinge mechanisms 40 for the dual-axis torque hinge apparatus 30 is well known, description is omitted here.

In the convertible 2 in 1 terminal apparatus 10 equipped with the swivel shaft 3 described above, the display 1 is held on the body by only the swivel shaft 3. This means that the display 1 is not held as stably as a notebook computer of a typical construction that is opened and closed using a hinge mechanism. The corners at both ends of the lower edge of the display 1 may also strike the body 2. For this reason, as depicted in FIG. 1B, support components 24, which hold the corners on the lower edge of the display 1 when the display 1 has been rotated around the axis 3A of the swivel shaft 3, may be provided on the upper surface of an upper cover 22 of the body 2.

When this configuration is used, protrusions 13 that are supported by the support components 24 are provided on the lower edge 1L of the display 1. As depicted in FIG. 1C, the protrusions 13 are each attached to a base member 13B fixed inside the lower edge 1L of the display 1. This means that in a state where the convertible 2 in 1 terminal apparatus 10 is being used like a notebook PC with the display 1 opened from the body 2, the display 1 is held by the swivel shaft 3 and the two support components 24. Since the support components 24 are subjected to large forces, such as collisions with the display 1, a high-strength resin, such as polyethylene, is used for the support components 24.

See, for example, the following documents:
Japanese Laid-open Patent Publication No. 2014-085734;
Japanese Laid-open Patent Publication No. H05-165546; and
Japanese Laid-open Patent Publication No. H01-130180.

However, a convertible 2 in 1 terminal apparatus equipped with the conventional swivel shaft described above has the following problems.

(1) Since the ground (earth) in the electric circuits in the body and the display are connected via the swivel shaft only, noise produced from the liquid crystal panel of the display or the like is not favorably sent to the earth in the body. Therefore, many components such as earth lines and aluminum sheets need to be provided inside the display as countermeasures against electromagnetic waves.

(2) A click-stop mechanism is needed to prevent the display from rotating around the swivel shaft when the display is opened and closed with respect to the body during use as a notebook computer. This makes the construction of the swivel shaft complex, which makes manufacturing difficult and increases the component cost.

FIG. 3 depicts how the conventional terminal apparatus 10 is protected against electromagnetic waves using electromagnetic sealing tape 9 as described in (1). Electromagnetic sealing tape 9 (labeled "9A" in the drawing) which protects against noise is stuck onto the periphery of a liquid crystal panel 8 incorporated in the display of the convertible 2 in 1 terminal apparatus 10. Aluminum tape may be used as the electromagnetic sealing tape 9A. To protect against noise and shorting, electromagnetic sealing tape 9 (labeled "9B" in the drawing) is also stuck onto a flexible cable that connects the driving circuit board of the liquid crystal panel 8 and the liquid crystal panel 8 itself and onto the flexible cable used for the touch panel. To protect against noise, electromagnetic sealing tape 9 (labeled "9C" in the drawing) is also stuck onto the inside of the case of the display 1 that houses the hinge mechanism.

SUMMARY

According to an aspect, there is provided a terminal apparatus which includes: a body; a display connected to the body by a swivel shaft; conductive components that are provided at both ends in a length direction of a side surface of the display facing the body, are connected to a ground of the display, and are exposed from the side surface; and support components that are conductive, are provided on an upper cover of the body, are connected to a ground of the body, and support the display from the body in a state where the support components are in conductive contact with the conductive components of the display.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
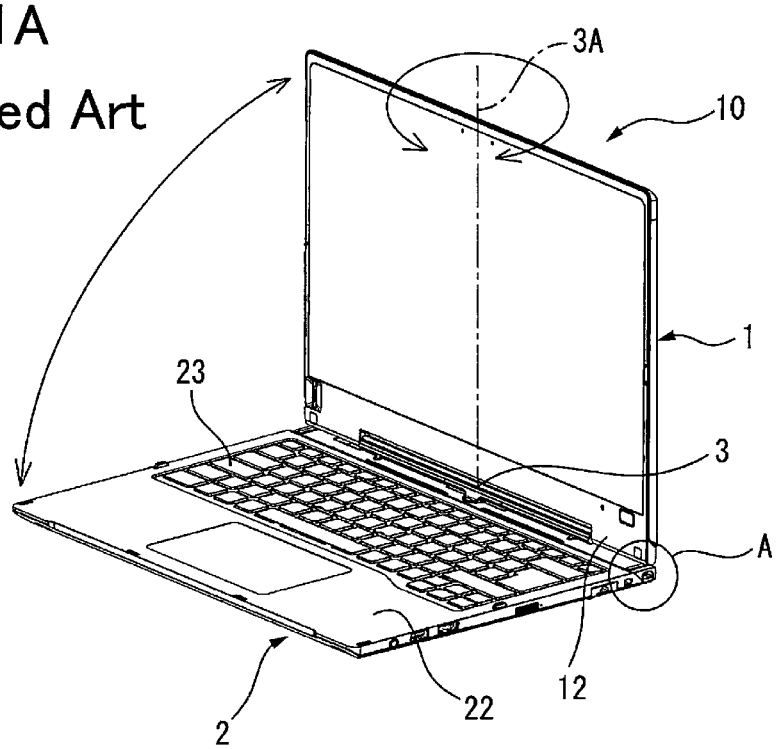
FIG. 1A is a perspective view depicting the appearance of a terminal apparatus.
Figure 1B:
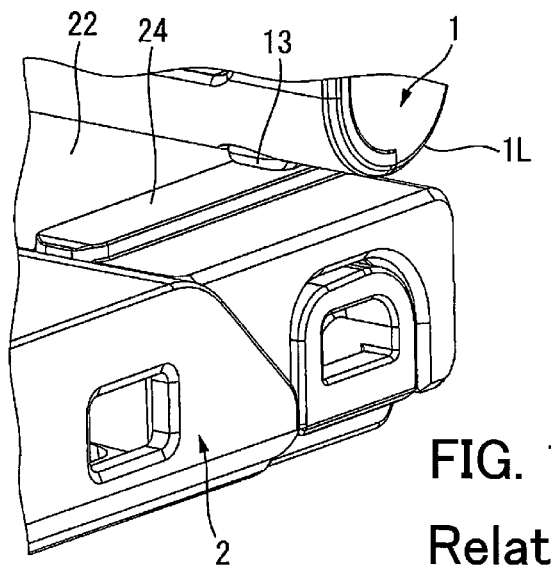
FIG. 1B is an enlarged perspective view of a part labeled "A" in FIG. 1A.
Figure 1C:
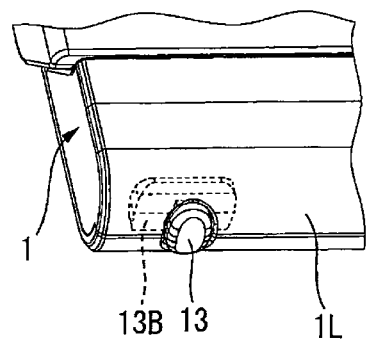
FIG. 1C is an enlarged perspective view of the construction of a lower edge of a display of the terminal apparatus.

Several embodiments will be described in detail below with reference to the accompanying drawings. Note that in the embodiments described below, elements that are the same or similar to the terminal apparatus described in the background art have been assigned the same reference numerals. For ease of explanation, the scale of the drawings has also been changed as appropriate. Although examples of a convertible 2 in 1 terminal apparatus are described in detail below as terminal apparatuses, a terminal apparatus according to the embodiments is not limited to a convertible 2 in 1 terminal apparatus. The embodiments may be applied to any terminal apparatus where a body and a display are connected using a swivel shaft.

Figure 2A:
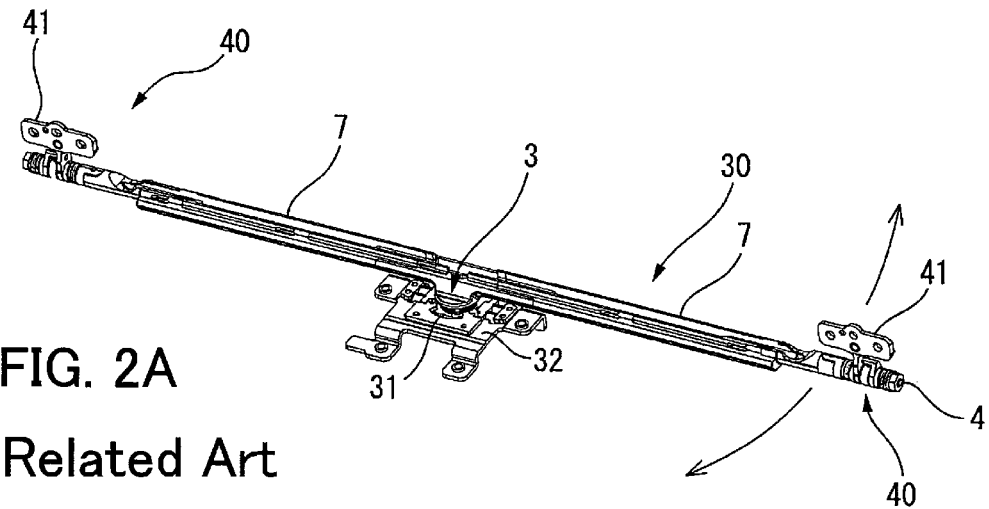
FIG. 2A is a perspective view of a dual-axis torque hinge apparatus equipped with a swivel shaft and a hinge mechanism according to a background art for joining the body and display of the terminal apparatus depicted in FIG. 1A.
Figure 2B:
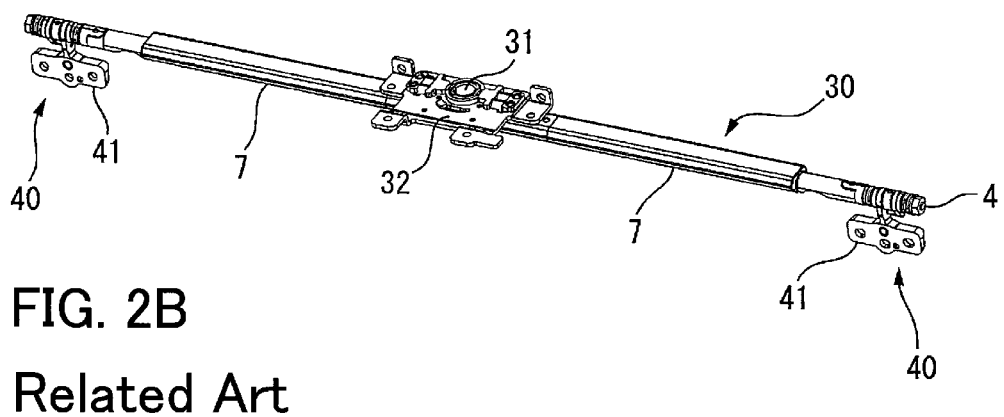
FIG. 2B is a perspective view depicting the dual-axis torque hinge apparatus depicted in FIG. 2A when looking from the rear.
Figure 4A:
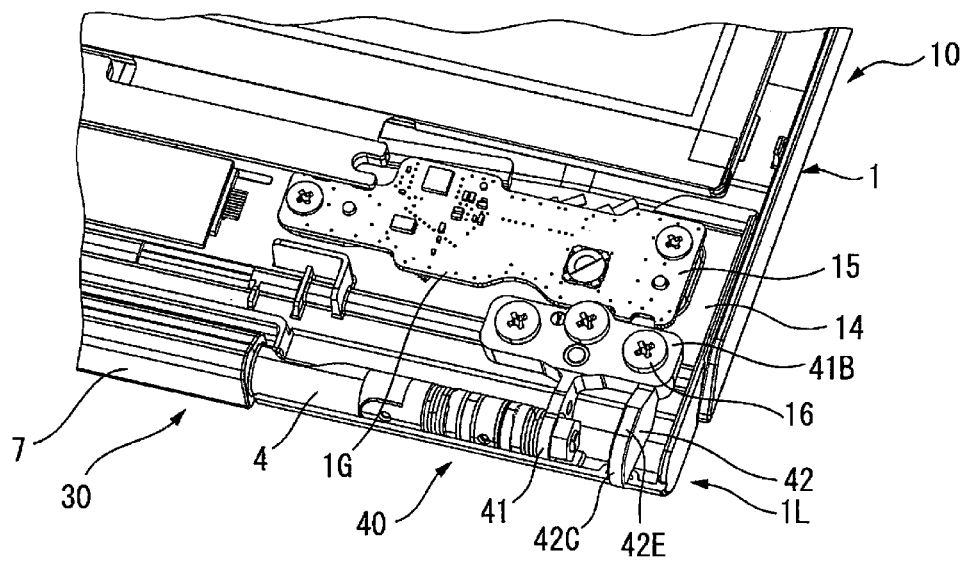
FIG. 4A is an enlarged perspective view depicting the construction of a hinge mechanism of the dual-axis torque hinge apparatus of a terminal apparatus with a cover of the display removed.

FIG. 4A is an enlarged perspective view of the hinge mechanism 40 of a dual-axis torque hinge apparatus 30 of a terminal apparatus 10 according to an embodiment in a state where the cover of the display 1 has been removed. In this terminal apparatus 10, a dual-axis torque hinge apparatus 30 like the dual-axis torque hinge apparatus 30 depicted in FIG. 2A is incorporated in the lower edge 1L of the display 1. A hinge shaft 4 is present at each end of the arm 7 in the dual-axis torque hinge apparatus 30, and a hinge mechanism 40 is formed on each hinge shaft 4. As described earlier, the hinge shaft 4 of the hinge mechanism 40 includes the bracket 41 and components such as a pressing plate, a plate spring, and a friction plate that enable the bracket 41 to rotate smoothly with respect to the hinge shaft 4. An attachment portion 41B of the bracket 41 is fixed to a back cover 14 of the display 1 by screws 16 and the back cover 14 is connected to a ground 1G of the display 1 (as one example, the ground 1G of a circuit board 15 in the display 1).

Figure 4B:
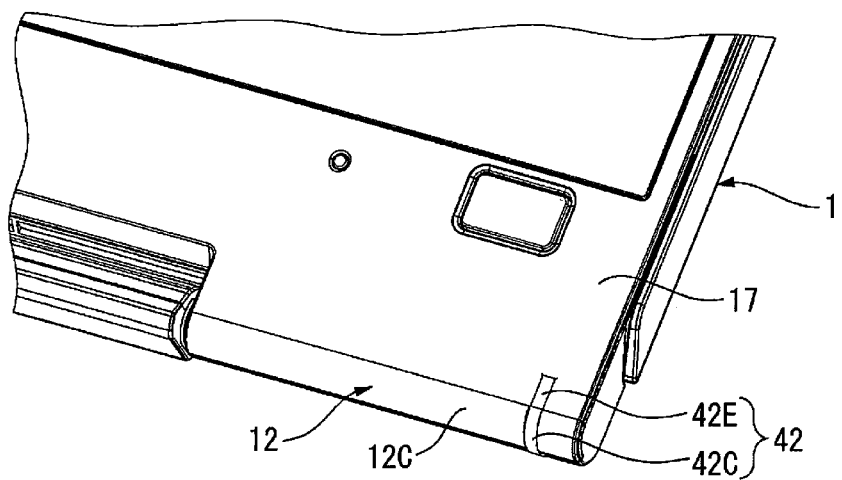
FIG. 4B is an enlarged perspective view depicting a state where the cover has been attached to the display depicted in FIG. 4A.

In this terminal apparatus 10, a protrusion 42, which protrudes in the direction of the hinge shaft 4 of the hinge mechanism 40, is integrally provided with the bracket 41 at a part of the attachment portion 41B of the bracket 41 away from the hinge mechanism 40. A front end of the protrusion 42 provided on the bracket 41 reaches a lower edge 1L-side side surface 12 of the case of the display 1. When the side surface 12 is a circumferential surface 12C centered on the axis of the hinge shaft 4 as depicted in FIG. 4B, the front end of the protrusion 42 is formed as a circumferential surface 42C. In addition, an extension 42E that is smoothly connected to the circumferential surface 42C is formed at a part that is continuous with the circumferential surface 42C formed at the front end of the protrusion 42. Since the bracket 41 is formed of a magnetic material, such as SUS 430, that is also conductive, the protrusion 42 is also formed of the same material.

Figure 4C:
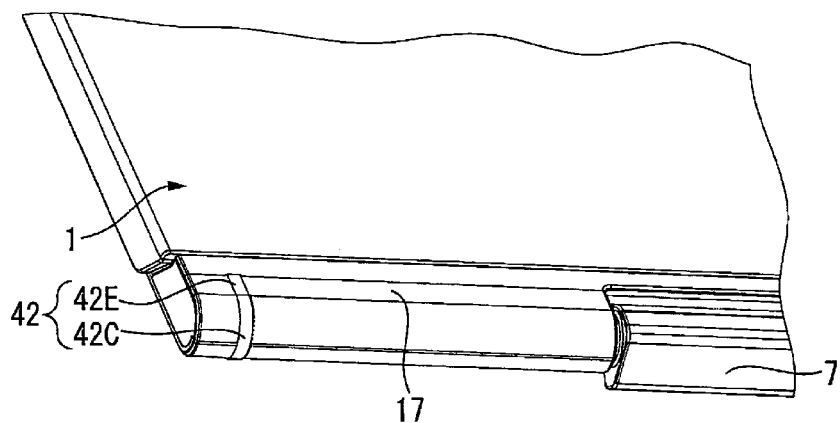
FIG. 4C is an enlarged perspective view depicting a state of a rear surface side of the display depicted in FIG. 4B.

With this configuration, when the cover is attached to the display 1, the circumferential surface 42C at the front end of the protrusion 42 and the circumferential surface 12C of the side surface 12 are flush, and the extension 42E and the cover 17 are also flush. FIG. 4C is an enlarged perspective view of a rear surface of the display 1 depicted in FIG. 4B. As depicted in the drawing, the extension 42E is flush with the cover 17 on the rear surface side of the display 1 also. Note that it is also possible for the circumferential surface 42C at the front end of the protrusion 42 to not be flush with the circumferential surface 12C of the side surface 12, and instead for the circumferential surface 42C at the front end of the protrusion 42 to protrude from the circumferential surface 12C of the side surface 12.

Figure 5A:
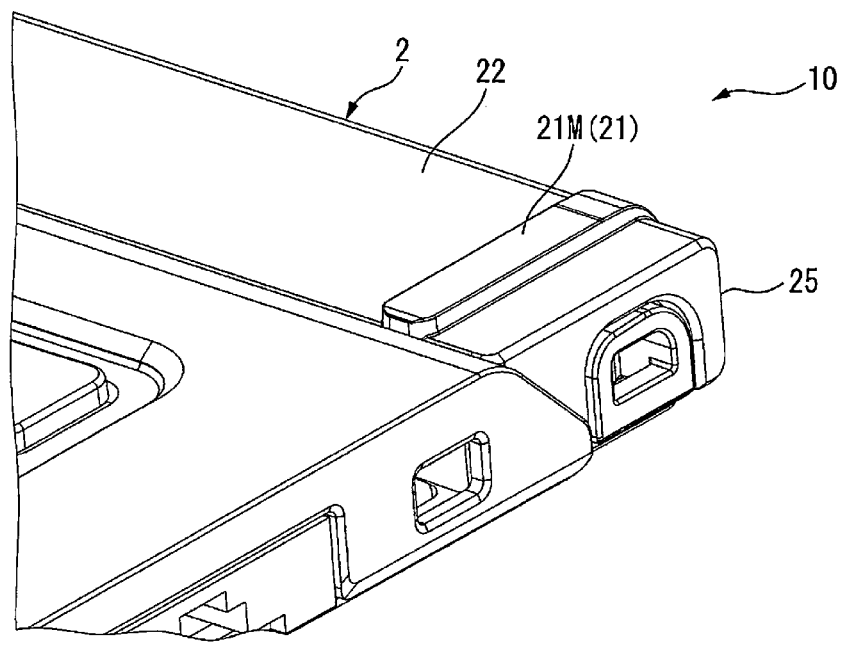
FIG. 5A is an enlarged perspective view of a first embodiment of support components that support a display and are provided on the body of a terminal apparatus.

FIG. 5A is an enlarged perspective view depicting the construction of a support component 21 of the display provided on the body 2 in a first embodiment of the terminal apparatus 10. In this first embodiment, an upper cover 22 of the body 2 is formed of a non-conductive member, for example, synthetic resin. For this reason, metal components 21M are provided as separate components to the upper cover 22 as conductive support components 21 that support the side surface 12 of the display 1 depicted in FIG. 4B and contact the circumferential surfaces 42C of the protrusions 42. As examples, the metal components 21M are formed of a magnesium alloy or an aluminum alloy. The metal components 21M are formed so as to surround a display side-side surface 25 of the body 2 and are not painted or given an alumite treatment so that conductive contact is made with the protrusions 42 when the metal components 21M touch the protrusions 42. By providing the metal components 21M on the upper cover 22 in this way, the strength of the body 2 is increased.

Figure 5B:
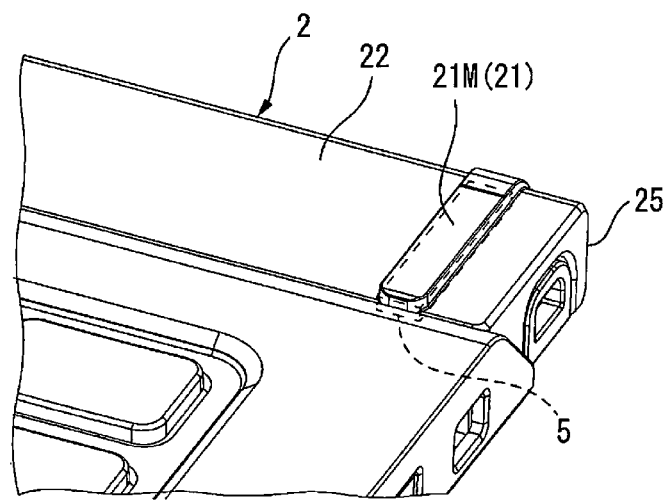
FIG. 5B is an enlarged perspective view of a second embodiment of support components that support a display and are provided on the body of a terminal apparatus.

FIG. 5B is an enlarged perspective view depicting the construction of a support component for the display provided on the body 2 according to a second embodiment of a terminal apparatus 10. In this second embodiment also, the upper cover 22 of the body 2 is formed of a nonmagnetic material, such as synthetic resin. For this reason, metal components 21M are provided on the surface of the upper cover 22 as conductive support components 21 that support the side surface 12 of the display 1 depicted in FIG. 4B and contact the circumferential surfaces 42C of the protrusions 42. The metal components 21M are formed so as to surround the display side-side surface 25 of the body 2. The second embodiment differs to the first embodiment only in that permanent magnets 5 are attached inside the case on a rear side of the metal components 21M.

Figure 6A:
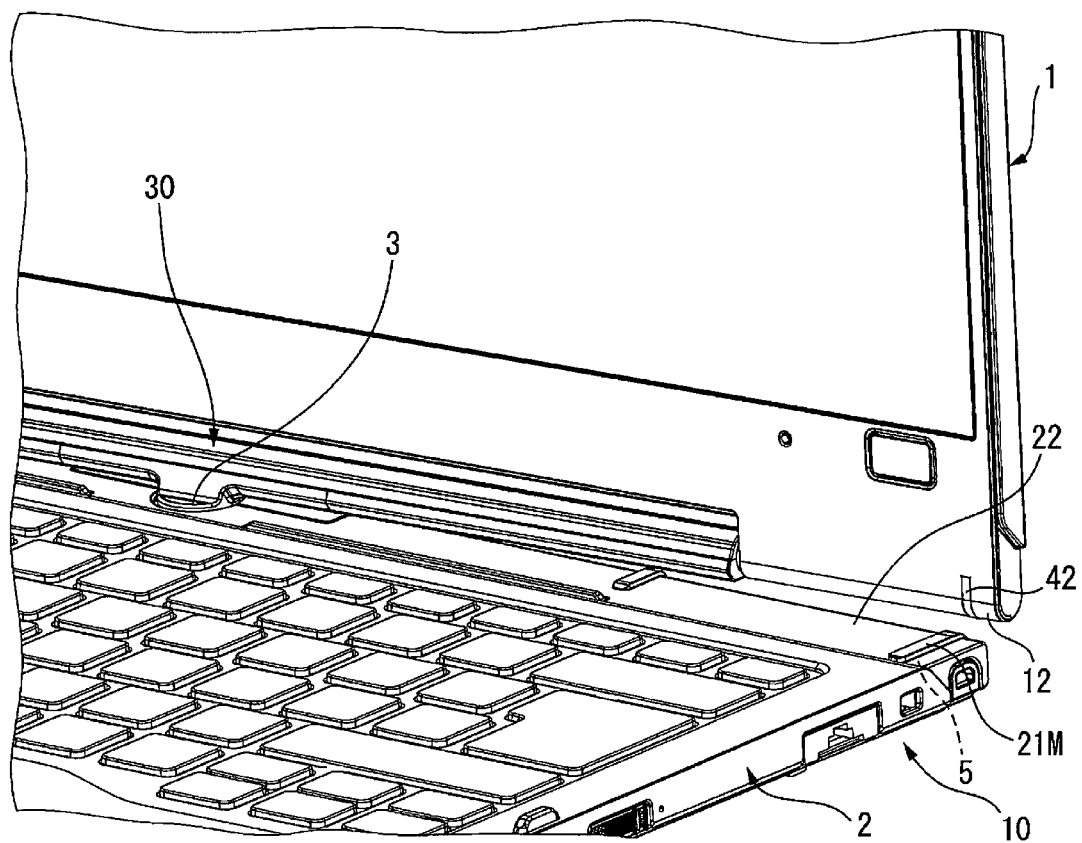
FIG. 6A is an enlarged perspective view of a terminal apparatus where a display is joined to a body by a dual-axis torque hinge apparatus, in a state where the display has been slightly rotated around a swivel shaft with respect to the body.

Here, as depicted in FIG. 6A, for the terminal apparatus 10 according to the second embodiment, consider a state where the display 1 is joined to the body 2 using the dual-axis torque hinge apparatus 30 and the display 1 has been slightly rotated around the swivel shaft 3 with respect to the body 2. With this second embodiment, the brackets 41 that are exposed on the side surface 12 of the display 1 are attracted to the permanent magnets 5 incorporated below the metal components 21M. When this happens, the display 1 rotates about the swivel shaft 3 toward the body 2 so that as depicted in FIG. 6B, the protrusions 42 of the brackets that are exposed on the side surface 12 of the display 1 become connected to the metal components 21M that are attached to the upper cover 22 of the body 2.

Figure 6B:
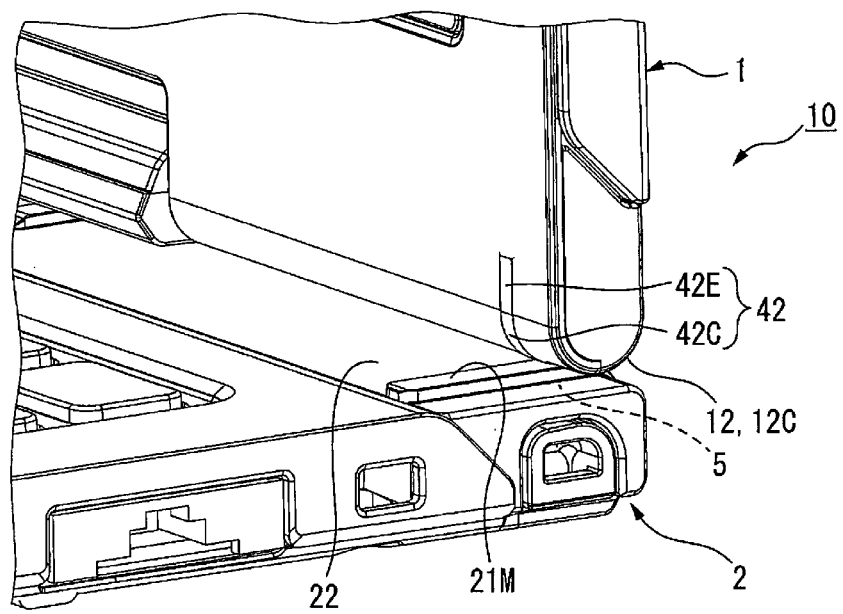
FIG. 6B is an enlarged perspective view in a state where a conductive component on the display depicted in FIG. 6A has been attracted to a magnet incorporated on the rear side of a support component on the body so that the conductive component is in conductive contact with the support component.
Figure 7:
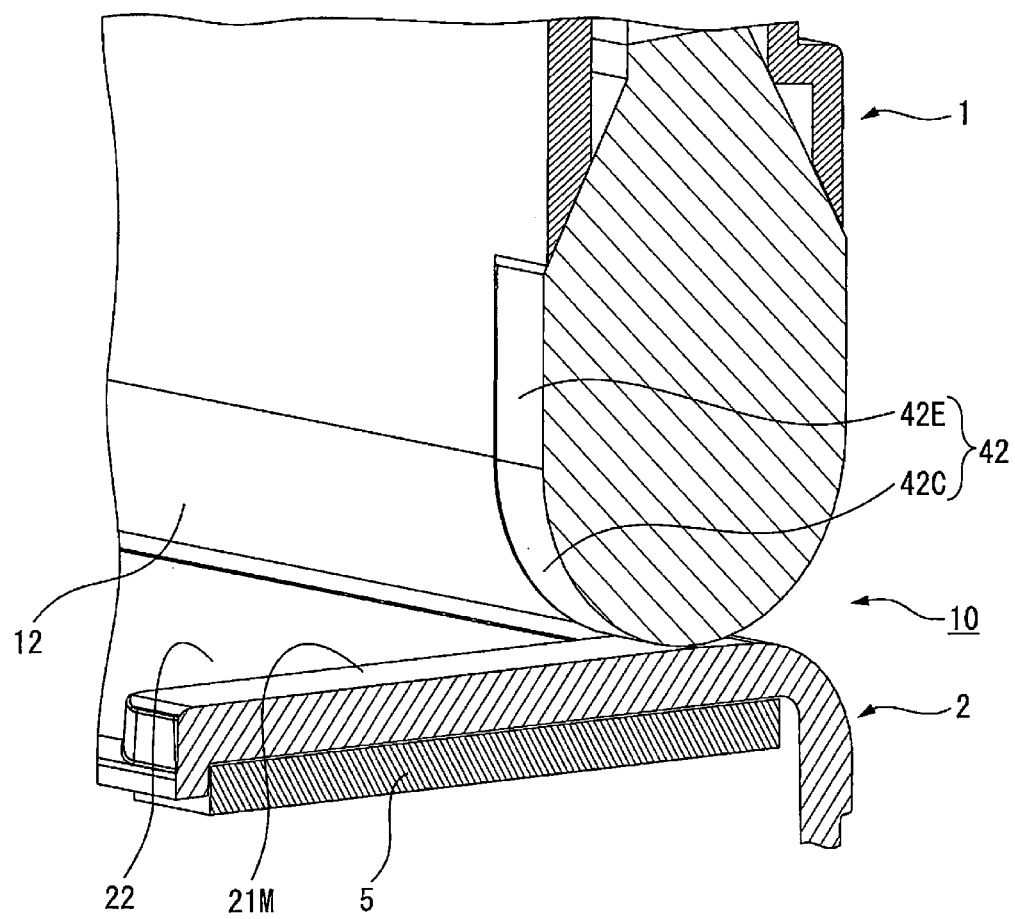
FIG. 7 is an enlarged perspective view of a state where the conductive component on the display depicted in FIG. 6B and the support component on the body have been attracted into conductive contact by a magnet provided in the body on the rear of the support component.

FIG. 7 is an enlarged cross-sectional view of a state where the protrusion 42 of a bracket in the display 1 depicted in FIG. 6B has been attracted by the permanent magnet 5 attached to the body 2 and the display 1 has rotated so that the protrusion 42 and the metal component 21M are in conductive contact. Since the circumferential surface 42C is formed at the front end of the protrusion 42 and the metal component 21M is formed so as to surround the display side-side surface 25 of the body 2, the protrusion 42 and the metal component 21M smoothly come into contact.

Figure 8A:
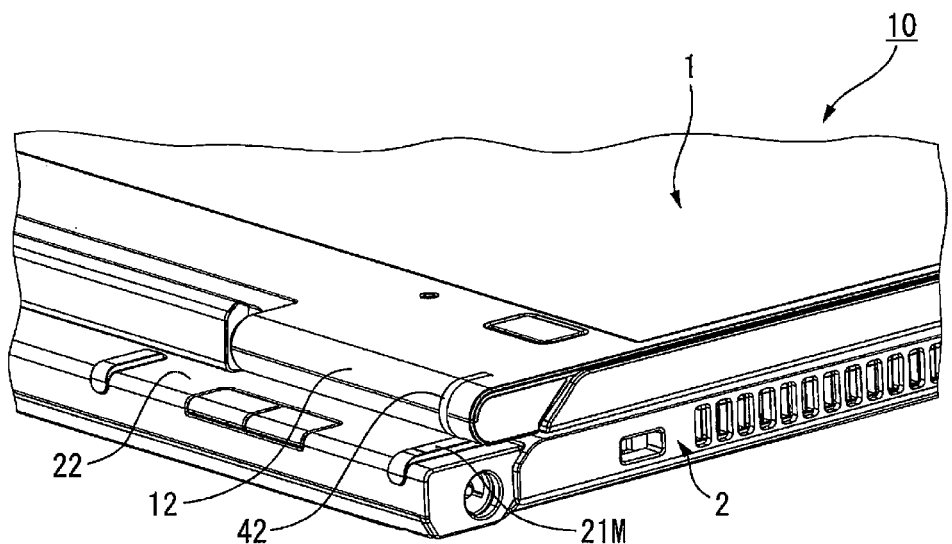
FIG. 8A is an enlarged perspective view of a state where the display has been folded over the body of the terminal apparatus to produce a tablet-like appearance.
Figure 8B:
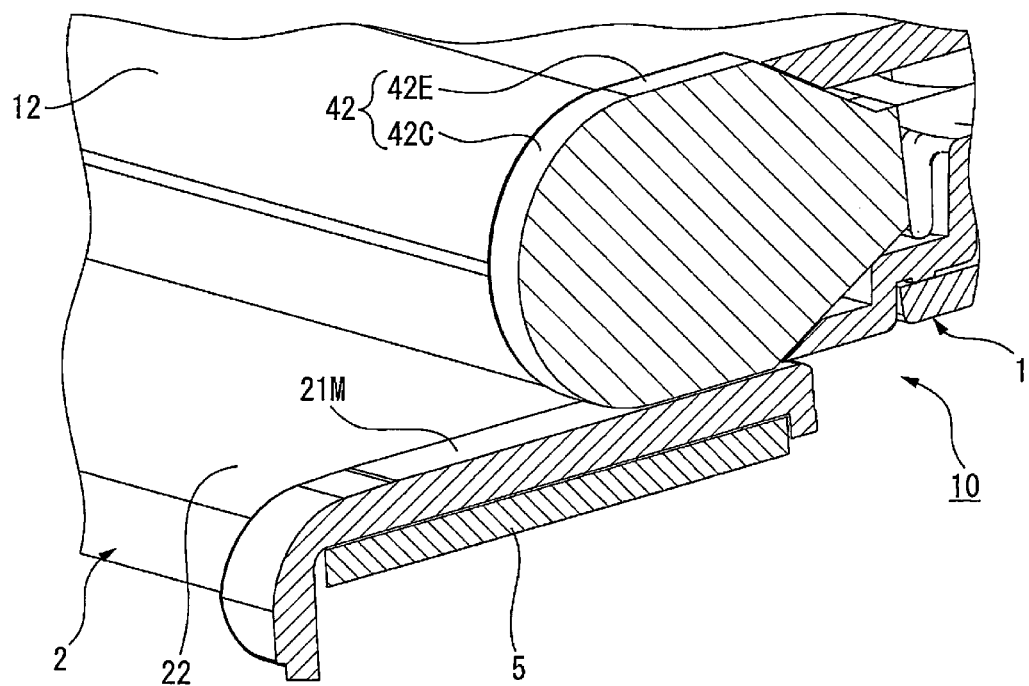
FIG. 8B is an enlarged perspective view of a state where the conductive component on the display and the support component on the body depicted in FIG. 8A are in conductive contact.

FIG. 8A is an enlarged perspective view of a tablet-like state where the display 1 has been folded over the body 2 of the terminal apparatus 10 according to the second embodiment. FIG. 8B is an enlarged cross-sectional view of a state where a protrusion 42 of a bracket of the display 1 and a metal component 21M of the body 2 have been attracted by a permanent magnet 5 provided in the body 2 and are in conductive contact. Since the extension 42E that continues from the circumferential surface 42C is formed on the protrusion 42 of the display 1, conductive contact is reliably established between the extension 42E and the metal component 21M even when the display 1 has been folded over the body 2 to produce the tablet-like state.

Figure 9A:
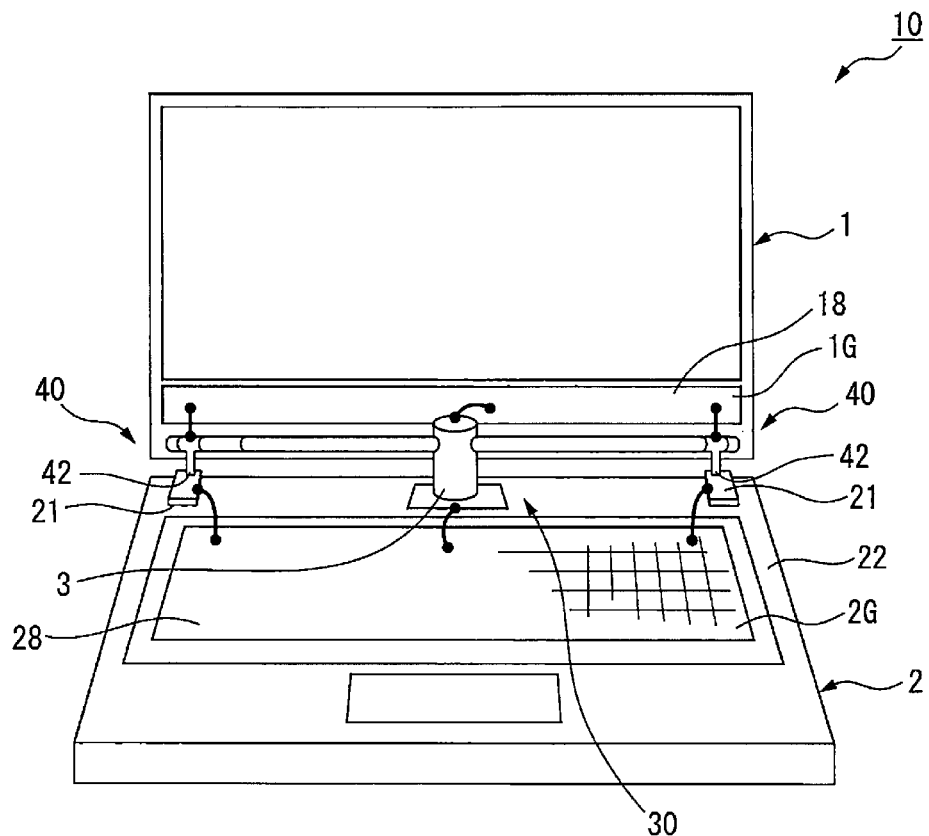
FIG. 9A depicts a state where the ground of the body and the ground of the display in the terminal apparatus are connected at three locations.

FIG. 9A depicts a state where a ground 1G of the display 1 of the terminal apparatus 10 and a ground 2G of the body 2 are connected at three locations. As examples, the ground 1G of the display 1 may be on a circuit board 18 and the ground 2G of the body 2 may be on a circuit board 28. The terminal apparatus 10 is configured so that the ground 1G of the display 1 and the ground 2G of the body 2 are originally connected by the swivel shaft 3 of the dual-axis torque hinge apparatus 30.

However, with the terminal apparatus 10, the ground 1G of the display 1 and the ground 2G of the body 2 are further connected by the hinge mechanisms 40 on both sides of the swivel shaft 3 of the dual-axis torque hinge apparatus 30. This means that the ground 1G of the display 1 and the ground 2G of the body 2 are connected at three locations including the swivel shaft 3 and the hinge mechanisms 40 disposed on both sides of the swivel shaft 3, so that any potential difference between the ground 1G of the display 1 and the ground 2G of the body 2 is reduced. Reducing the potential difference between the ground 1G of the display 1 and the ground 2G of the body 2 makes the terminal apparatus 10 more resistant to noise. It is also possible to eliminate components, such as earth wires, electromagnetic wave-absorbing sheets, and aluminum tape, that had to be used in conventional terminal apparatuses to protect against electromagnetic waves.

Figure 2C:
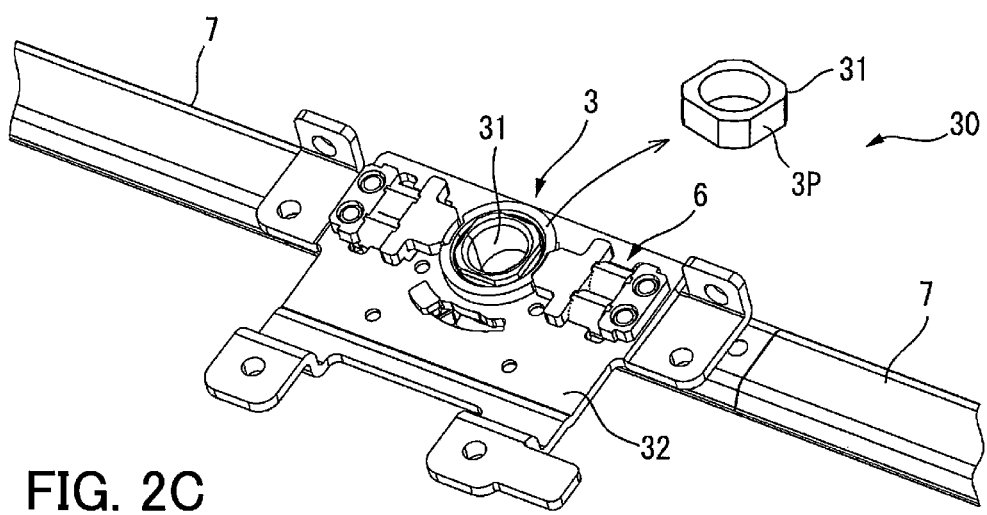
FIG. 2C is an enlarged perspective view depicting an enlargement of a principal part of the dual-axis torque hinge apparatus depicted in FIG. 2B with a rotational shaft of the swivel shaft having been removed.
Figure 3:
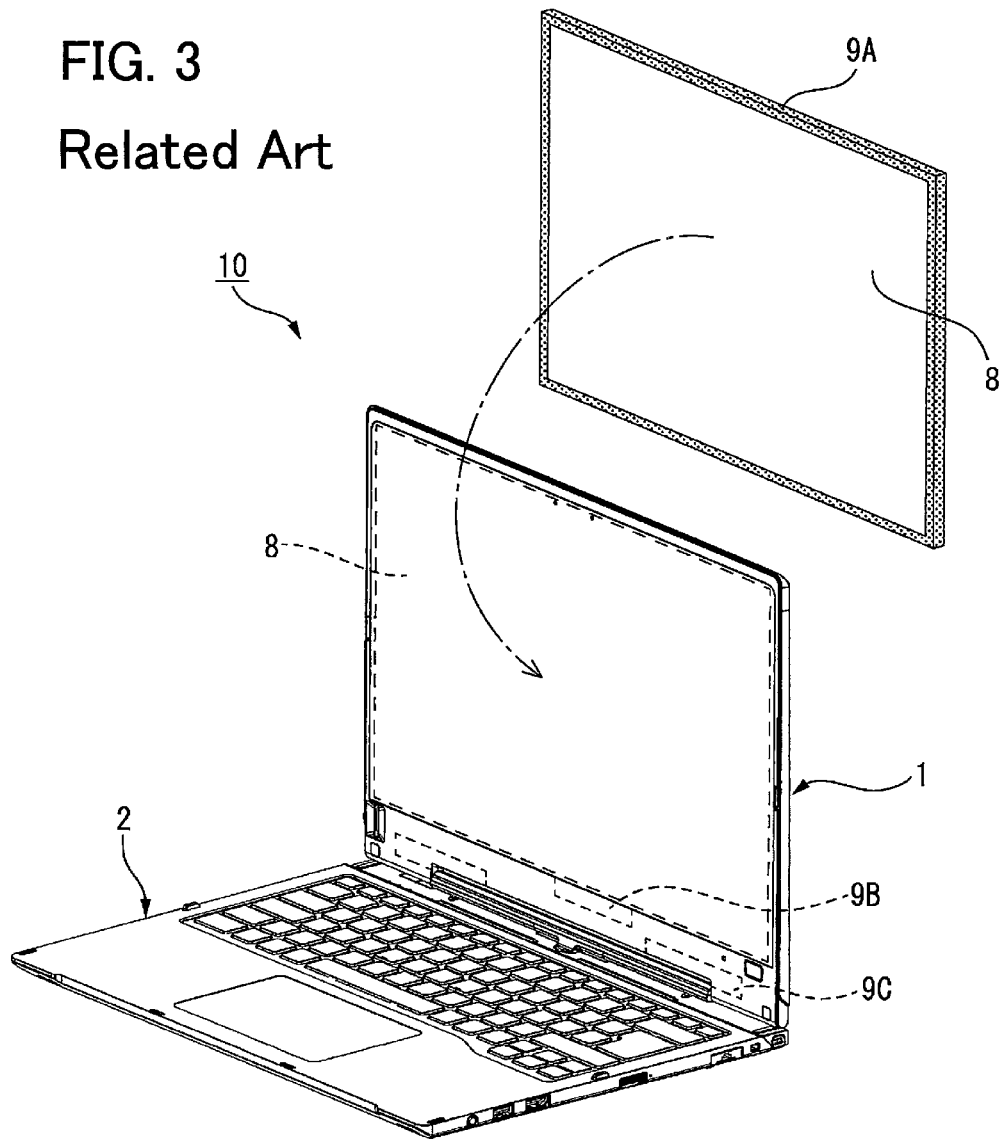
FIG. 3 is a perspective view depicting anti-noise components provided on a display and locations of the anti-noise components when the body and display of a terminal apparatus have been joined using the dual-axis torque hinge apparatus depicted in FIG. 2A.
Figure 9B:
FIG. 9B is an enlarged perspective view depicting the construction of a rotational shaft of the swivel shaft according to the second embodiment.

With the second embodiment described above, due to the permanent magnets 5 incorporated on the rear sides of the conductive support components 21 on the upper cover 22, the display 1 rotates around the swivel shaft 3 with respect to the body 2 and then the rotation stops in a state where the brackets 41 have been attracted to the permanent magnets 5. This means that the swivel shaft 3 does not need the pressing mechanism 6 that was described in FIG. 2C to stop the rotation of the display 1, which simplifies the construction of the swivel shaft 3 and reduces cost. In addition, in the second embodiment, since the swivel shaft 3 does not need the pressing mechanism 6, parallel surfaces do not need to be provided on the outer circumferential surface of the rotational shaft 31, which simplifies the construction of the rotational shaft 31 as depicted in FIG. 9B. This has further effects of improving the manufacturability and the cost of the hinge mechanism 40 and allowing effective use to be made of the space gained by eliminating components (as examples, allowing further miniaturization or easing restrictions on cable routing).

Figure 10A:
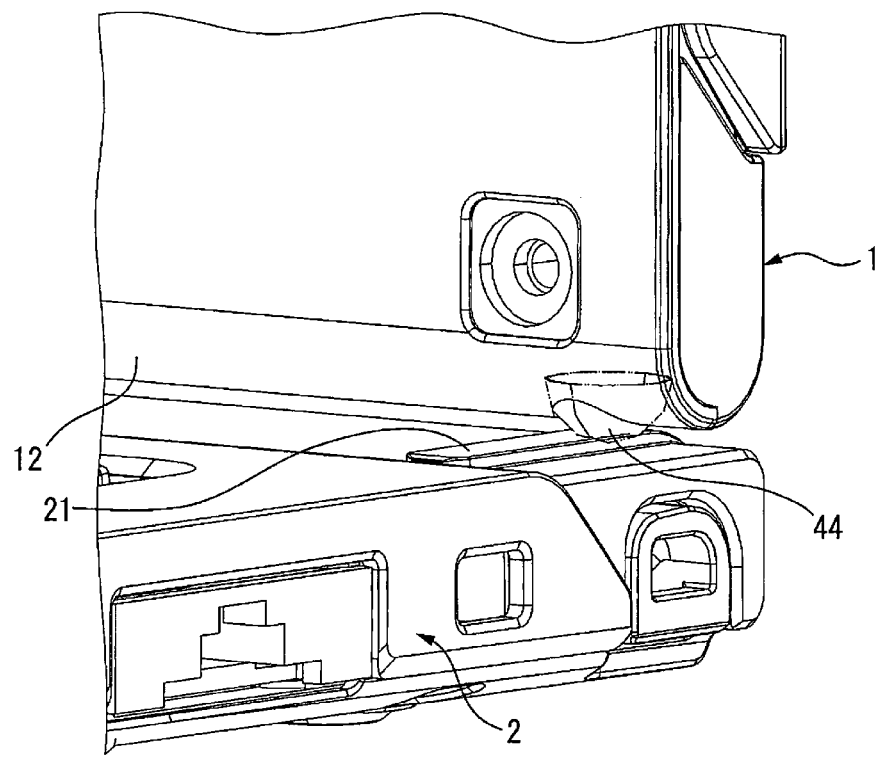
FIG. 10A is an enlarged perspective view depicting the construction of conductive components provided on a display and support components provided on the body according to a third embodiment of a terminal apparatus.

FIG. 10A is an enlarged perspective view depicting the construction of a conductive component 44 of the display 1 according to a third embodiment of a terminal apparatus 10, in a state where the (conductive) support component 21 of the body 2 and the conductive component 44 are connected. In the first and second embodiments, the conductive components of the display 1 are the protrusions 42 provided on the brackets 41 of the hinge mechanisms 40, with the circumferential surfaces 42C or the extensions 42E at the front end of the protrusions 42 contacting the conductive support components 21 (the metal components 21M) of the body 2. In this third embodiment however, the conductive components 44 of the display 1 are formed so as to be capable of moving in a direction perpendicular to the surfaces of the conductive support components 21 of the body 2.

Figure 10B:
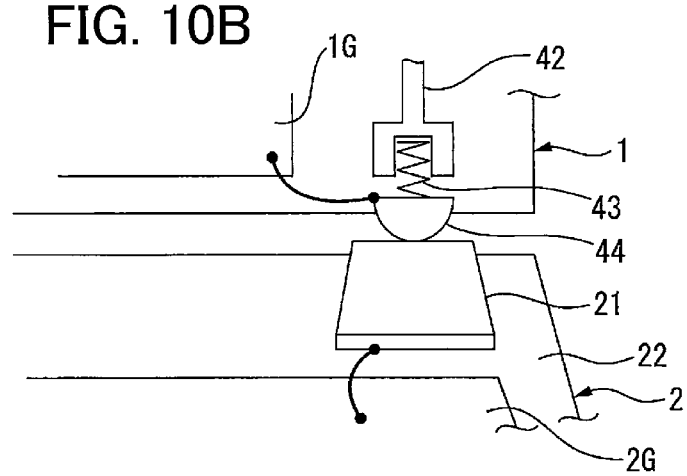
FIG. 10B depicts an example construction of a conductive component of a display according to the third embodiment.

A conceivable example of a construction where the conductive components 44 of the display 1 are movable with respect to the conductive support component 21 of the body 2 is depicted in FIG. 10B. In this construction, the conductive component 44 that is movable is attached via a spring 43 to the front end of the protrusion 42, the front end of the conductive component 44 protrudes from the side surface 12, and the conductive component 44 is connected to the ground 1G of the display 1. Note that the conductive components 44 do not need to be provided at the front end of the protrusions 42 and it is possible to use a construction where the conductive components 44 press the conductive support components 21 of the body 2 in a state where the conductive components 44 are connected to the ground 1G of the display 1.

Although the upper cover 22 of the body 2 is formed of a nonconductive member, for example, synthetic resin in the embodiments described above, the upper cover 22 of the body 2 may instead be formed of a conductive member. In this configuration, parts of the upper cover 22 that face the protrusions 42 that are exposed on the side surface 12 of the display 1 may bulge in the same form as the metal components 21M that were described in the first to third embodiments. There are no particular limitations on the bulging parts of the upper cover 22. When the upper cover 22 of the body 2 is formed of a conductive member, it is possible to provide the permanent magnets 5 described in the second embodiment on the rear surfaces of the bulging parts of the upper cover 22.

This completes the detailed description of preferred embodiments of a terminal apparatus.

In the terminal apparatuses equipped with a swivel shaft described above, a continuous ground connection between the electrical circuits provided in the body and the display is achieved by the swivel shaft itself and conductive components provided on both sides of the swivel shaft. This reduces any potential difference between the respective grounds of the body and the display. When magnets that attract the conductive components are also disposed in the body, it is possible to simplify the construction of the swivel shaft.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A terminal apparatus comprising:
a body;
a display connected to the body by a swivel shaft;
conductive components that are provided at both ends in a length direction of a side surface of the display facing the body, are connected to a ground of the display, and are exposed from the side surface; and
support components that are conductive, are provided on an upper cover of the body, are connected to a ground of the body, and support the display from the body in a state where the support components are in conductive contact with the conductive components of the display,
wherein the swivel shaft includes a base portion, which is fixed to the body, and a rotational shaft, which is fixed to the display and is rotatable with respect to the base portion,
a hinge shaft is provided along the length direction of the side surface of the display on both sides of the rotational shaft in a direction that is perpendicular to an axis of the rotational shaft,
hinge mechanisms that open and close the display with respect to the body are provided at both ends of the hinge shaft, and the conductive components are protrusions provided on brackets that attach the hinge mechanisms to the display.

2. The terminal apparatus according to claim 1,
wherein the upper cover is formed of a nonconductive material and the support components are metal components provided on a surface of the upper cover.

3. The terminal apparatus according to claim 2,
wherein surfaces of the metal components are located at a predetermined height above the surface of the upper cover.

4. The terminal apparatus according to claim 2,
wherein the side surface of the display facing the body is formed as a first circumferential surface,
the protrusions each have a second circumferential surface that is flush with the first circumferential surface and an extension that is continuous with the second circumferential surface, and
the metal components connect to and support the protrusions when the display is opened and closed with respect to the body using the hinge mechanisms.

5. The terminal apparatus according to claim 4,
wherein front ends of the protrusions are formed so as to press a surface of the metal components when the protrusions come into connective contact with the metal components.

6. The terminal apparatus according to claim 2,
wherein the side surface of the display facing the body is formed as a first circumferential surface,
the protrusions each have a second circumferential surface that protrudes slightly beyond the first circumferential surface and an extension that is continuous with the second circumferential surface, and are each located at a predetermined height above the side surface, and
the metal components become continuous with and support the protrusions when the display is opened and closed with respect to the body using the hinge mechanisms.

7. The terminal apparatus according to claim 1,
wherein permanent magnets are provided in the body inside the support components.

8. The terminal apparatus according to claim 7,
wherein an outer circumferential surface of the rotational shaft is a circumferential surface, and
the rotational shaft is capable of freely rotating with respect to the base portion of the swivel shaft.

9. The terminal apparatus according to claim 1,
wherein the upper cover is made of a conductive metal material, and
the support components are the upper cover.

10. The terminal apparatus according to claim 9,
wherein parts of the upper cover that face the conductive components are bulges that are raised by a predetermined height with respect to other parts of the upper cover.

11. The terminal apparatus according to claim 10,
wherein permanent magnets are provided in the body inside the bulges.

12. The terminal apparatus according to claim 1,
wherein at least one pair of parallel surfaces, which are parallel to an axis of the swivel shaft and have the axis in between, is formed in an outer circumferential surface of the rotational shaft, and
a pressing mechanism, which presses the parallel surfaces from both sides to fix an angle of the rotational shaft with respect to the base portion, is provided on an outside of the base portion of the swivel shaft.

* * * * *